Figure 1:
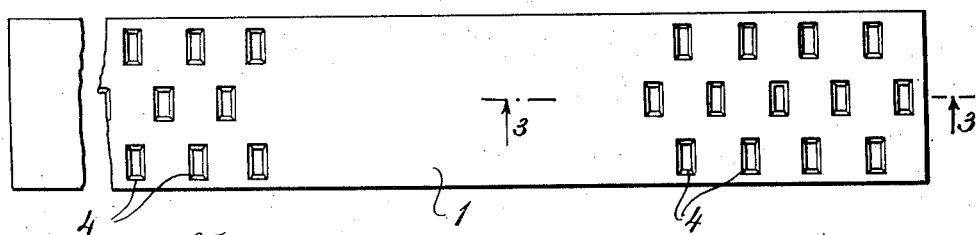

Aug. 24, 1926.

J. BRINCIL 1,597,428

BEARING AND METHOD OF MAKING IT

Filed July 2, 1925

INVENTOR
Joseph Brincil
BY
Pennie, Davis, Marvin & Edmonds
his ATTORNEYS

Patented Aug. 24, 1926.

1,597,428

UNITED STATES PATENT OFFICE.

JOSEPH BRINCIL, OF PLAINFIELD, NEW JERSEY.

BEARING AND METHOD OF MAKING IT.

Application filed July 2, 1925. Serial No. 41,066.

This invention relates to bushing bearings and their manufacture, particularly to bearings of the self-lubricating type. It is old in making bearings of this type to provide the metal face of the bearing with inserts of graphite or other solid lubricant but it is difficult to make these inserts stay in place. It has been proposed to stamp depressions in the face of a strip of bearing metal, fill these depressions with graphite and then roll the strip into cylindrical form. This type of bearing is relatively inexpensive to make, but is not wholly satisfactory in use due to the fact that the graphite inserts are likely to be displaced owing to the fact that the depressions cannot be made to lock them in place. It has also been proposed to make self-lubricating bearings having dove-tailed, and hence locking, grooves, by extruding metal through an annular die shaped to provide undercut grooves in the inner face of the tube, these grooves being subsequently filled with graphite which is held in place because of the shape of the grooves. Such a bearing, although satisfactory, is very expensive to make. It has also been proposed to perforate a strip of bearing metal, bend this strip into cylindrical form, place it within a second concentric unperforated cylinder and fill the perforations with the graphite. This bearing is also unsatisfactory, not only because the graphite inserts are likely to fall out, but because the two cylindrical members of the bearing are likely to become separated unless they are permanently joined in some manner.

According to the present invention, I have provided an inexpensive method of making a self-lubricating bearing which shall be free of the objections cited above. I take a strip of bearing metal such as brass or bronze and perforate a section of it, with a series of perforations preferably having flaring side walls. I obtain this result by the use of properly shaped punches. A section of the strip adjacent the perforated section and substantially equal in length to the circumference of the bearing is left unperforated. This strip, partly perforated and partly unperforated, is then wound about an arbor of a diameter slightly larger than that of the finished bearing, the winding taking place with the perforated section innermost and the perforations so arranged that the small ends are adjacent the arbor and the large ends come in contact with the unperforated section of the strip which overlies the perforated section. After the winding operation the two ends of the strip are adjacent each other, one on the inside and the other on the outside of the structure. I then fill the perforations with a lubricating paste such as graphite and preferably bake it before proceeding to the final shaping operation which comprises placing the bearing upon an arbor slightly smaller than the first arbor, but of exactly the proper size, and swaging it to reduce it to perfect cylindrical form. The hammering of the swaging machine forces the metal of the outer ply of the bearing into the perforations in the inner a slight distance, thus completely locking the parts and making any relative movement impossible.

Figure 2:
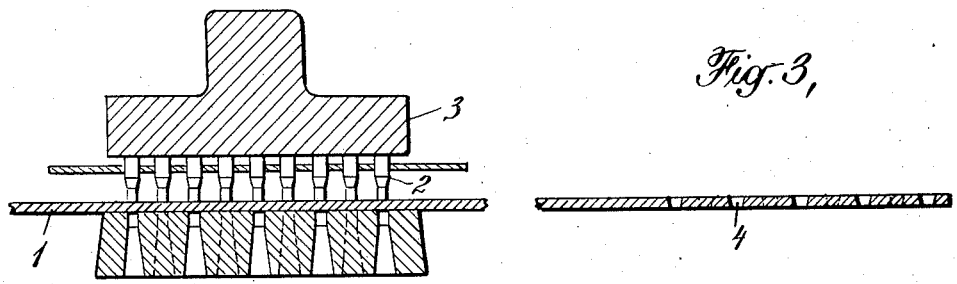
Figure 3:
Figure 4:
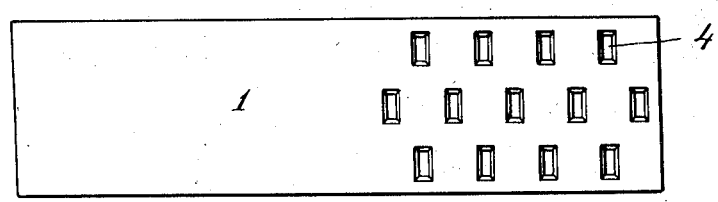
Figure 7:
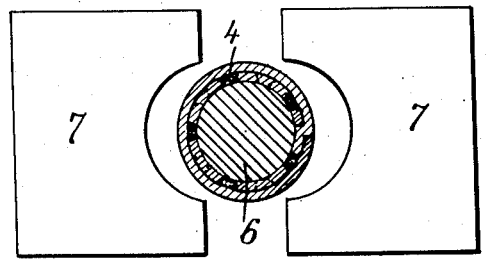
Figure 5:
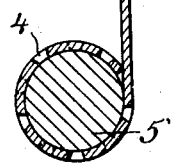
Figure 6:
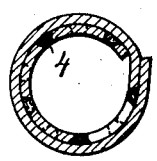

In the accompanying drawings I have illustrated, more or less diagrammatically, the apparatus used and the various steps followed in the manufacture of a bearing in accordance with the present invention. In these drawings, Figure 1 is a plan view of a strip of bearing metal with two sets of perforations punched therein; Figure 2 is a transverse longitudinal vertical section through a punch and die used to pierce and dove-tail the perforations; Figure 3 is a section taken along line 3—3 of Figure 1; Figure 4 is a plan view of a unit strip used in the manufacture of a single bearing; Figure 5 is a longitudinal section through a strip of bearing metal showing the first step in the winding operation; Figure 6 is a similar section showing a completely wound bearing, and Figure 7 is a transverse section through the swaging arbor and completed bearing showing diagrammatically the elements of the swaging press.

In the drawings 1 represents a strip of bearing metal which is fed beneath the piercing punches 2 of the press 3 and perforated at intervals as indicated in Figure 1 with a series of perforations 4. These perforations are provided with outwardly flaring side walls by virtue of the shape of the piercing punches as illustrated in Figure 2. The strip 1 is fed through the press step-by-step by any well-known mechanism and in such a manner that the perforated sections are followed by unperforated sections of slightly greater length. After the punching operation the strips are cut into units as illustrated in Figure 4 by means of any desired cutting or shearing means.

The unit strip illustrated in Figure 4 is then wound about an arbor 5 of slightly larger diameter than the diameter of the finished bearing. As illustrated in Figure 5 the perforated section of the strip is wound innermost with the small ends of the perforations adjacent the arbor. When the winding has been completed the bearing is then in the shape illustrated in Figure 6. At this stage in the manufacture I prefer to insert the graphite which is introduced into perforations in the form of a paste and baked in situ. It will be noted that the graphite inserts once in place are securely locked against displacement by the converging side walls of the perforations and the outer unperforated ply of the bearing.

The bearing is then mounted upon a second arbor 6 of exactly the diameter of the finished bearing and placed between the semi-cylindrical jaws 7 of a swaging machine, the two ends of the strip being placed substantially along the bisecting radius of one of the jaws. The hammering action of the swaging machine causes the bearing to assume the shape illustrated in Figure 6 with the two ends closely adjacent and the outer face of the inner ply lying in substantially the same cylindrical surface with the inner face of the outer ply at this point. The resultant bearing is perfectly cylindrical both internally and externally, and due to the fact that it is all made of one piece of metal, and also due to the fact that the hammering action of the swaging machine forces some of the metal of the outer ply into the perforations, a strong, substantially unitary structure results, the various parts of which cannot become dislodged during use.

I claim:

1. In a method of making a self-lubricating bushing bearing the steps comprising forming perforations in part of a strip of bearing metal, winding the strip into spiral form with the perforations innermost, and filling the perforations with a lubricant.

2. In a method of making a self-lubricating bushing bearing, the steps comprising forming perforations in a part of a strip of bearing metal; winding the strip into spiral form with the perforations innermost, and the unperforated part overlying the perforated part; and filling the perforations with a lubricant.

3. In a method of making a self-lubricating bushing bearing the steps comprising forming perforations in one-half the length of a strip of bearing metal, the strip being of a length substantially twice the circumference of the complete bearing, winding the strip into spiral form with the perforations innermost and filling the perforations with a lubricating paste.

4. In a method of making a self-lubricating bushing bearing the steps comprising forming perforations having flaring side walls in a strip of bearing metal, winding the strip into spiral form about an arbor with the perforations innermost and the small end of each perforation adjacent the arbor and filling the perforations with a lubricating paste.

5. In a method of making a self-lubricating bushing bearing the steps comprising forming perforations having flaring side walls in one-half the length of a strip of bearing metal the length of the strip being substantially twice the circumference of the completed bearing, winding the strip into spiral form about an arbor with the perforations innermost and the small end of each perforation adjacent the arbor and the large end covered with the unperforated half of the strip, and filling the perforations with a lubricating paste.

6. The method of making a self-lubricating bushing bearing which comprises forming perforations in a strip of bearing metal, winding the strip into spiral form with the perforations innermost, filling the perforations with a lubricating paste and swaging the resultant structure to make a bearing of substantially equal wall thickness throughout its circumference.

7. The method of making a self-lubricating bushing bearing which comprises forming perforations in one-half the length of a strip of bearing metal, the length of the strip being substantially twice the circumference of the completed bearing, winding the strip into spiral form with the perforations innermost so that the two ends of the strip lie closely adjacent, filling the perforations with a lubricating paste and swaging the resultant structure to make a bearing of substantially equal wall thickness throughout its circumference.

8. The method of making a self-lubricating bushing bearing which comprises forming a cylindrical bearing element having perforations in its bearing face for receiving a lubricant, surrounding said element with a second element and swaging the resultant structure to force the metal of the outer element into the perforations of the inner element and interlock the two.

9. A self-lubricating bushing bearing comprising a spiral strip of bearing metal the inner ply being perforated and the perforations filled with a lubricant.

10. A self-lubricating bushing bearing comprising multiple plys of a single strip of spirally wound bearing metal, the inner ply being perforated and the perforations filled with a lubricant.

11. A self-lubricating bushing bearing made up of a spirally wound strip of bearing metal, the inner part of the strip being perforated and the perforations filled with graphite and the outer part of the strip overlying the inner.

12. A self-lubricating bushing bearing in the form of a spirally wound strip of metal, the inner end of the strip being perforated with perforations having inwardly flaring side walls and the perforations filled with graphite, the outer end of the strip overlying the inner and locking the graphite inserts in place, the inner face of the outer end of the strip being in substantially the same cylindrical surface as the outer face of the inner end.

In testimony whereof I affix my signature.

JOSEPH BRINCIL.